United States Patent [19]

Mixich et al.

[11] 4,192,922

[45] Mar. 11, 1980

[54] FINELY DIVIDED EXPANDABLE STYRENE POLYMERS

[75] Inventors: Johann Mixich; Horst Jastrow, both of Kelkheim, Fed. Rep. of Germany

[73] Assignee: Hoechst Aktiengesellschaft, Frankfurt, Fed. Rep. of Germany

[21] Appl. No.: 13,275

[22] Filed: Feb. 21, 1979

[30] Foreign Application Priority Data

Feb. 23, 1978 [DE] Fed. Rep. of Germany ....... 2807710

[51] Int. Cl.$^2$ .............................. C08J 9/18; C08J 9/20
[52] U.S. Cl. .............................. 521/56; 260/45.8 NT; 260/45.7 R; 521/90; 521/98; 521/907

[58] Field of Search ..................... 521/90, 907, 98, 56; 260/45.8 NT, 45.7 RL

[56] References Cited

U.S. PATENT DOCUMENTS 4,049,622  9/1977  Fleig et al. ............................... 54/90

*Primary Examiner*—Morton Foelak
*Attorney, Agent, or Firm*—Curtis, Morris, & Safford

[57] ABSTRACT

The invention provides finely grained, expandable particles of a styrene homopolymer or copolymer which contain an expanding agent and a flameproofing organic halogen compound as well as, in addition a 2,4-diamino-1,3,5-triazine derivative.

2 Claims, 1 Drawing Figure

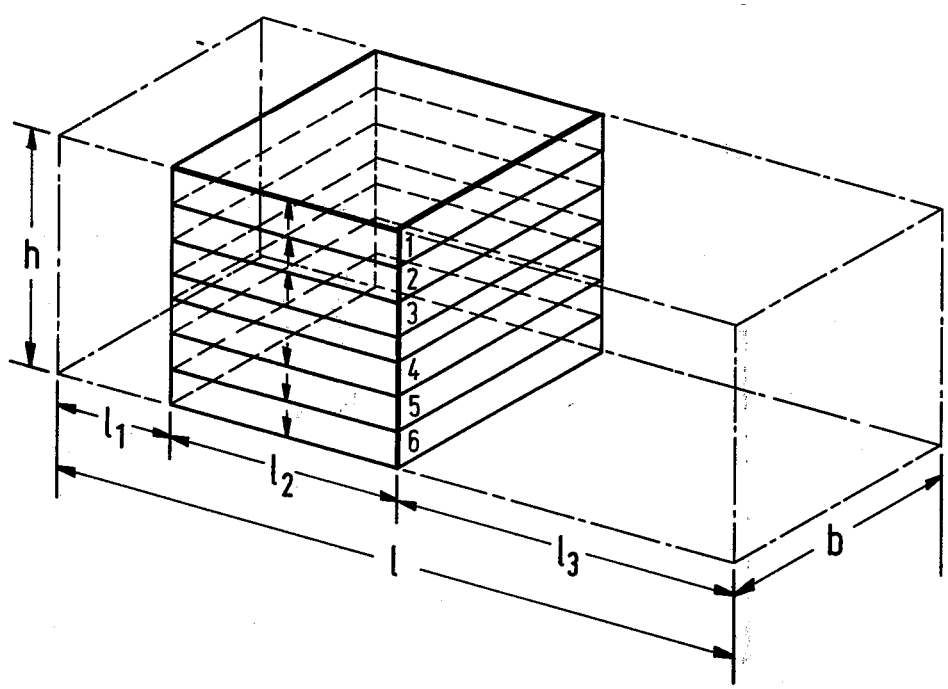

FINELY DIVIDED EXPANDABLE STYRENE POLYMERS

In the manufacture of expandable styrene polymers containing a flameproofing organic halogen compound products are obtained which collapse to a large extent after prefoaming, thus preventing adjustment of the low unit weights desired. A further disadvantage of these products resides in the fact of a high loss of expanding agent during the prefoaming operation, so that only poorly welded foam blocks are obtained because of a too low concentration of expanding agent. Furthermore, the surface of shaped articles made from these foam blocks is very irregular and grainy, containing sunk spots and molten-looking beads.

It is known from German Offenlegungsschrift No. 25 20 635 that expandable styrene polymers being self-extinguishing due to a content of halogen compounds can be processed to foam blocks of improved weld when they contain certain amines. However, also this method does not yield entirely satisfactory products.

It is the object of the present invention to provide compounds which, used in low concentration, prevent the occurrence of the above drawbacks such as bulk density increase, poor weld and irregular block surface.

In accordance with this invention, there has been surprisingly found that styrene polymers containing expanding agents and made self-extinguishing by a content of halogen compounds do not collapse but to an insignificant extent after prefoaming and can be processed to foam blocks of good weld and excellent surface quality when they contain a small amount of 2,4-diamino-1,3,5-triazines substituted in 6-position.

The present invention provides therefore particles of a styrene homo- or copolymer containing an expanding agent and a flameproofing organic halogen compound, which comprise in addition from 0.0001 to 0.1, preferably 0.001 to 0.05, % by weight, relative to the polymer, of a 2,4-diamino-1,3,5-triazine derivative of the formula

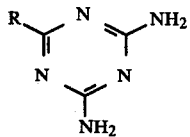

in which

R is an alkyl radical having from 1 to 20, preferably 4 to 15, carbon atoms, where optionally a H atom in ω-position is substituted by a 2,4-diamino-1,3,5-triazine-6-yl radical; or a cycloalkyl radical having from 5 to 12 carbon atoms, or a cycloalkyl-alkyl or alkyl-cycloalkyl radical having from 6 to 13 carbon atoms, or an aryl radical having from 5 to 12, preferably 6 to 12, carbon atoms; or an alkylaryl or aralkyl radical having from 6 to 13, preferably 7 to 13, carbon atoms.

According to the invention there can be improved expandable styrene homopolymers or copolymers with alphamethylstyrene, styrenes halogenated at the nucleus such as 2,4-dichlorostyrene, acrylonitrile, methacrylonitrile; esters of alpha, beta-unsaturated carboxylic acids with alcohols having from 1 to 8 carbon atoms such as acrylic or methacrylic esters; or vinyl carbazole. The comonomers are obtained in the styrene copolymers in an amount of up to 50% by weight at most.

The expandable styrene polymers contain as expanding agents the usual gaseous or liquid organic compounds which do not dissolve the styrene polymer but expand it only, and the boiling point of which is below the softening point of the polymer, such as aliphatic hydrocarbons, for example propane, butane, pentane, hexane; cycloaliphatic hydrocarbons, for example cyclohexane; furthermore halogenated hydrocarbons, for example dichlorodifluoromethane, 1,2,2-trifluoro-1,1,2-trichloro-ethane. Mixtures of these compounds may be used, too.

The expanding agent is used in an amount of from 3 to 15, preferably 5 to 8, % by weight, relative to the polymer.

Examples of flameproofing organic halogen compounds to be used in the styrene polymers of the invention are: entirely or partially brominated oligomers of butadiene or isoprene, for example brominated 1-vinylcyclohex-3-ene, brominated cycloocta-1,5-diene, brominated cyclododeca1,5,9-triene, or brominated polybutadiene having a polymerization degree of for example 3 to 15; brominated phosphoric esters such as tris-(2,3-dibromopropyl)-phosphate; phenylalkyl or phenylalkyl ethers brominated at the nucleus such as pentabromo-phenylallyl ether; pentabromomonochlorocyclohexane or other cyclohexanes containing at least 3 bromine atoms.

The organic halogen compounds are contained in the expandable styrene polymer in an amount of from 0.4 to 3% by weight.

In addition to the halogen compounds, the well-known synergistic agents may be used in normal amounts, preferably organic peroxides, especially those having a half-life of at least 2 hours at 373 K.

Examples of 2,4-diamino-1,3,5-triazine derivatives to be used in accordance with this invention are the following:
6-methyl-2,4-diamino-1,3,5-triazine (acetoguanamine)
6-ethyl-2,4-diamino-1,3,5-triazine (propioguanamine)
6-propyl-2,4-diamino-1,3,5-triazine (butyroguanamine)
6-isopropyl-2,4-diamino-1,3,5-triazine (isobutyroguanamine)
6-nonyl-2,4-diamino-1,3,5-triazine (caprinoguanamine)
6-heptadecyl-2,4-diamino-1,3,5-triazine (palmitinoguanamine)
6-cyclopentyl-2,4-diamino-1,3,5-triazine
6-cyclohexyl-2,4-diamino-1,3,5-triazine
6-cyclohexylmethyl-2,4-diamino-1,3,5-triazine
6-methylcyclohexyl-2,4-diamino-1,3,5-triazine
6-phenyl-2,4-diamino-1,3,5-triazine (benzoguanamine)
6-(3-pyridyl)-2,4-diamino-1,3,5-triazine
6-benzyl-2,4-diamino-1,3,5-triazine (phenylacetoguanamine)
6-toluyl-2,4-diamino-1,3,5-triazine
6-xylyl-2,4-diamino-1,3,5-triazine As an example of a 6-alkyl-2,4-diamino-1,3,5-triazine where an H atom of the alkyl group in ω-position is substituted by a 2,4-diamino-1,3,5-triazine-6-yl radical, succinoguanamine having the following formula may be cited:

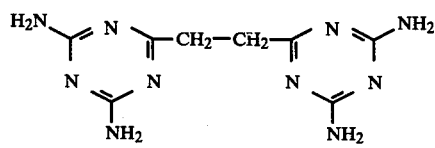

Mixtures of 2 or more of the diamino-triazine derivatives in accordance with this invention may likewise be used.

The expandable styrene polymers of this invention are prepared by polymerization, advantageously according to the suspension or bead polymerization processes known per se, at temperatures of from about 353 to 403 K. Polymerization is initiated in known manner by means of one or more radical-forming substances, using preferably organic peroxides or mixtures thereof as initiators, such as t-butyl-perbenzoate, t-butyl-peroctoate, dibenzoyl peroxide, t-butyl-peracetate. Alternatively, the known azo compounds such as azo-bis-isobutyronitrile may be used.

The choice of the initiators depends on the polymerisation temperature. When the polymerization is carried out in several steps at different temperature stages, it is advantageous to use mixtures of initiators having varying half-lives.

For stabilizing the suspension, the usual inorganic suspension agents such as tricalcium phosphate, barium sulfate, zinc oxide and the like, or organic protecting colloids such as poly-N-methyl-N-vinylacetamide, polyvinyl alcohol, methyl cellulose and the like may be employed. Amount and time of addition of the suspension stabilizer depend on the intended particle size of the styrene polymers.

The diamino-triazine derivative used in accordance with the invention can be added before or during the polymerization.

In addition to the above compounds and substances, the foamable styrene polymer particles in accordance with the invention may contain usual amounts of plasticizers, UV and light stabilizers, dyestuffs as well as externally applied finishing agents, for example agents preventing clumping in the prefoaming operation.

The styrene particles of the invention are dried and optionally screened. They may then be prefoamed in usual manner and, after intermediate storage, expansion is completed in molds to give shaped articles.

The foamed articles manufactured from the expandable styrene polymer particles of the invention are distinguished by a good weld and excellent surface quality.

The following Examples illustrate the invention.

EXAMPLE 1 (Comparative Test)

The following mixture was fed to a pressure-tight vessel made from corrosion-proof steel and provided with agitator, which vessel was flushed with nitrogen:

73 kg of deionized water
75.5 kg of styrene
450 g of 1,2,5,6,9,10-hexabromo-cyclododecane
75 g of dicumyl peroxide
120 g of dibenzoyl-peroxide
187.5 g of t-butylperbenzoate.

After having closed the vessel, the mixture was polymerized with agitation for 6.5 hours at 363 K and for 3 hours at 393 K. After a conversion of about 40 to 47% of styrene was achieved, 1.275 g of potassium peroxodisulfate in 100 ml of water and 298 g of tricalcium phosphate in 3 liters of water were added. After 4 hours at 363 K, 5.9 kg of an expanding agent mixture consisting of 75% by weight of n-pentane and 25% by weight of isopentane was forced into the vessel within 15 to 20 minutes.

After the polymerization was complete, the batch was cooled to room temperature. The polymer was separated, dried and screened. In a commercial prefoaming apparatus, the fraction having a grain size of from 0.8 to 1.6 mm was prefoamed batchwise with steam in such a manner that after pneumatic conveyance and a 24 hour intermediate storage a bulk density of 15 g/l was obtained. Subsequently (after the 24 hour intermediate storage), the expansion of the material was completed in a 48 liter mold by means of steam under a pressure of 1.8 bars to yield foamed blocks. The test results are listed in Table 1.

EXAMPLE 2 (Comparative Test)

The polymerization was carried out as indicated in Example 1; however, 3.75 g of N,N-dimethyl-N-dodecylamine were added to the initial polymerization batch. Work-up of the polymer, that is, separation, drying, screening, prefoaming and block manufacture, was carried out as indicated sub Example 1. The results of the test are listed in Table 1.

EXAMPLE 3

In this test, the same mixture was polymerized under the same conditions as indicated in Example 1; however, 3.75 g (0.005 weight %, relative to styrene) of 2,4-diamino-6-nonyl-1,3,5-triazine were added to the initial polymerization batch. All other steps of work-up were carried out as described in Example 1. The test results are listed in Table 1.

EXAMPLE 4

While increasing the amount of 2,4-diamino-6-nonyl-1,3,5-triazine to 18.75 g (0.025 weight %, relative to styrene) the mixture of Example 3 was polymerized. After an analogous work-up, results as indicated in Table 1 were obtained.

EXAMPLE 5

Polymerization was carried out as indicated in Example 1; however, 3.75 g (0.005 weight %, relative to styrene) of 2,4-diamino-6-phenyl-1,3,5-triazine were added to the initial polymerization batch. Work-up of the polymer beads and block manufacture were carried out according to the method indicated in Example 1. The test results are listed in Table 1.

Table 1

| Example | Increase of bulk density[1] (g/l) | piston distance[2] (mm) | block surface |
|---|---|---|---|
| 1 (Comp. test) | 2.5 | 23 | in bad shape[3] |
| 2 (Comp. test) | 1.5 | 29 | good |
| 3 | 1.4 | 36 | good |
| 4 | 0.8 | 40 | good |
| 5 | 1.2 | 35 | good |

[1]Increase of bulk density of the prefoamed beads after pneumatic conveyance into a silo and a 24 hour intermediate storage.
[2]Determined by a compress-bend-crack test (description see below). The piston distance is a measure for the quality of the weld in the foam.
[3]Irregular grainy surface containing partially collapsed and molten-looking beads.

Compress-bend-crank Test
Manufacture of the test plates:

From a foam block having the dimensions of (l=600 mm)×(b=400 mm)×(h=200 mm), 6 plates are cut as follows (see the accompanying drawing): Transversally to the longitudinal direction, the block is cut into 3 pieces having the lengths $l_1=100$ mm, $l_2=200$ mm, $l_3=300$ mm. The piece having the length $l_2=200$ mm is shortened by 10 mm at both ends in the direction of the broadside and subsequently cut transversally to the direction of its height into 3 upper plates (1, 2, 3) and 3 lower plates (4, 5, 6) having each a height (thickness) of 30 mm. The test plates have the following dimensions: 200 mm×380 mm×30 mm.

During the block manufacture, the upper and the lower block surface (l×b) contact the walls of the foaming mold via which the steam enters into the interior of the mold. The other 4 walls of the mold serve for the ventilation of the mold. Test procedure:

The plates are compressed in their longitudinal direction (380 mm) between the stationary piston and the piston moving at a rate of 100 mm/min of a pull/compression test apparatus, in which test the plates are simultaneously bent vertically to the direction of compression. The specified direction of blending is shown in the drawing by the arrows in the plates 1* to 6*. The piston distance is measured in mm. It is the distance covered by the moving piston from the start until the test plate cracks. A longer piston distance is equivalent to an increased weld.

What is claimed is:

1. Foamable particles of a styrene homo- or copolymer containing an expanding agent and a flameproofing organic halogen compound, which comprise in addition from 0.0001 to 0.1, preferably 0.001 to 0.05, % by weight, relative to the polymer, of a 2,4-diamino-1,3,5-triazine derivative of the formula

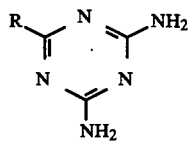

in which
R is an alkyl radical having from 1 to 20, preferably 4 to 15, carbon atoms, where optionally a H atom in ω-position is substituted by a 2,4-diamino-1,3,5-triazine-6-yl radical; or a cycloalkyl radical having from 5 to 12 carbon atoms, or a cycloalkyl-alkyl or alkyl-cycloalkyl radical having from 6 to 13 carbon atoms, or an aryl radical having from 5 to 12, preferably 6 to 12, carbon atoms; or an alkylaryl or aralkyl radical having from 6 to 13, preferably 7 to 13, carbon atoms.

2. Process for the preparation of foamable polymer particles by homo-polymerization or copolymerization of styrene in aqueous suspension in the presence of an expanding agent and a flameproofing organic halogen compound, which comprises adding to the polymer batch from 0.0001 to 0.1, preferably 0.001 to 0.05, weight %, relative to the amount of monomer styrene or the total amount of monomer styrene and comonomer, of particles of a 2,4-diamino-1,3,5-triazine derivative of the formula

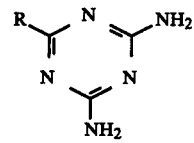

in which
R is an alkyl radical having from 1 to 20, preferably 4 to 15, carbon atoms, where optionally a H atom in ω-position is substituted by a 2,4-diamino-1,3,5-triazine-6-yl radical; or a cycloalkyl radical having from 5 to 12 carbon atoms, or a cycloalkyl-alkyl or alkyl-cycloalkyl radical having from 6 to 13 carbon atoms, or an aryl radical having from 5 to 12, preferably 6 to 12, carbon atoms; or an alkylaryl or aralkyl radical having from 6 to 13, preferably 7 to 13, carbon atoms.

* * * * *